United States Patent [19]
Nakamura

[11] 4,447,135
[45] May 8, 1984

[54] ZOOM LENS SYSTEM
[75] Inventor: Akiyoshi Nakamura, Sakai, Japan
[73] Assignee: Minolta Camera Kabushiki Kaisha, Osaka, Japan
[21] Appl. No.: 468,642
[22] Filed: Feb. 22, 1983

Related U.S. Application Data
[63] Continuation of Ser. No. 164,509, Jul. 2, 1980, abandoned.

[30] Foreign Application Priority Data

Jul. 13, 1979 [JP] Japan .................................. 54-89433

[51] Int. Cl.³ ........................ G02B 13/04; G02B 15/14
[52] U.S. Cl. ................................................ 350/426
[58] Field of Search ........................................ 350/426

[56] References Cited
U.S. PATENT DOCUMENTS
4,099,846  7/1978  Kawamura et al. ................ 350/426

Primary Examiner—John K. Corbin
Assistant Examiner—Rebecca D. Gass
Attorney, Agent, or Firm—Jackson, Jones & Price

[57] ABSTRACT

An improved wide angle zoom lens system of an inverted telephoto type having a negative object side lens group and a positive image side lens group is provided, in which an air space to be varied in accordance with the shift of the object side lens group for focusing is located at the image side of a negative component in the object side lens group.

18 Claims, 14 Drawing Figures

ZOOM LENS SYSTEM

RELATED APPLICATIONS

This is a continuation of application Ser. No. 164,509, filed July 2, 1980 and now abandoned.

BACKGROUND OF THE INVENTION

1. Field of the Invention

The present invention generally relates to a zoom lens system, and more particularly to a wide angle zoom lens system.

2. Description of the Prior Art

In this field of art, there has been known a zoom lens system, which has a first negative lens group located at the front of the zoom lens system and a second positive lens group located at the image side of the first lens group with a variable air space formed between the first and second lens groups. In the zoom lens system, the first and second lens groups are shiftable along the optical axis with the variable air space changing during the zooming operation, and the first lens group alone is shiftable along the optical axis in the focusing operation. Such a zoom lens system is of an inverted telephoto type because of the negative front lens group, and is favorable for designing a wide angle lens system.

The above mentioned zoom lens system of an inverted telephoto type, however, is unfavorable when focusing on a close object, i.e. the field curvature of the lens system changes in response to the close focusing. Further, various additional changes in aberrations are caused by the movement of the first lens group in the focusing operation. In other words, the astigmatic difference is increased with the field curvature positively deviated, and the spherical aberration is negatively deviated, if the zoom lens system is focused to a close object by means of the shifting of the first lens group. U.S. Pat. No. 4,099,846 is cited of interest in zoom lens systems.

SUMMARY OF THE INVENTION

An object of the present invention is to provide a zoom lens system capable of wide angle photography and of focusing on a close object without a substantial deterioration of aberration correction.

Another object of the present invention is to provide a zoom lens system capable of wide angle photography, in which the negative deviation of spherical aberration as well as the positive deviation of field curvature, which would be caused by the close focusing, is corrected.

A still another object of the present invention is to reduce the minimum object distance covered by a wide angle zoom lens system.

A further object of the present invention is to provide the above mentioned zoom lens system in a compact size.

According to the present invention, the first negative lens group is provided with at least one variable air space, which is varied in accordance with the focusing operation, and the zoom lens system fulfills the following conditions:

$$1.4 < |f_{I1}|/f_S < 3.0 \text{ and } f_{I1} < 0$$

$$0.3 < d/f_S < 0.8,$$

wherein $f_I$ represents the over-all focal length of lens components on the object side of the variable air space in the first lens group, d represents the axial width of the variable air space in the first lens group with the zoom lens system focused to infinity, and $f_S$ represents the focal length of the whole zoom lens system in the shortest focal length condition.

According to another feature of the present invention, the variable air space in the first lens group is located at the image side of a negative component.

The objects and features of the present invention which are believed to be novel are set forth with particularity in the appended claims. The present invention, both as to its organization and manner of operation, together with further objects and advantages thereof, may best be understood by reference to the following description, taken in connection with the accompanying drawings.

DESCRIPTION OF THE PREFERRED EMBODIMENT

The following description is provided to enable any person skilled in the optical art to make and use the present invention and sets forth the best modes contemplated by the inventor of carrying out his invention. Various modifications, however, will remain readily apparent to those skilled in the art, since the generic principles of the present invention have been defined herein specifically to provide a wide angle zoom lens system of an inverted telephoto type.

The derivation of the specific parameters of the lens embodiments disclosed herein can be accomplished with the assistance of a computer. The present invention represents the parameters of a compromise balance of acceptable aberrations in a relatively easily manufactured lens assembly that is particularly suited for a single lens reflex camera. The data presented herein in the Tables, to be discussed subsequently, are more than adequate to permit a competent artisan in the optical art to reproduce the embodiments of the present invention.

In the accompanying drawings, which supplement the following Tables, the lens systems in accordance with the present invention, are illustrated schematically. As usual, in conventional lens diagrams, the light is assumed to travel from left to right.

In the Tables, the radii of curvature of the lenses are indicated by the letter, r, with a subscript corresponding to the consecutive surfaces of the lens elements from left to right in view of the drawings. The minus (—) signs indicate surfaces concave toward the object side, while the surfaces without a sign are convex toward the object side. The Tables also disclose the axial spacings with the letter, d, again with a subscript indicating the distance consecutively from the left to right. The axial spacings will include both the thickness of the lens and the air spaces and in this regard, the value of the axial spacings between the lens elements are appropriately positioned relative to the values of the radius of curvature to indicate whether the axial distances is an air space or a thickness of the lens. All linear dimensions are given in absolute values. The Tables also provide, with respect to each embodiment, the field angle 2ω, the F number and the focal length range, f. The refractive index is designated at N, while the Abbe number is ν.

Figure 1:
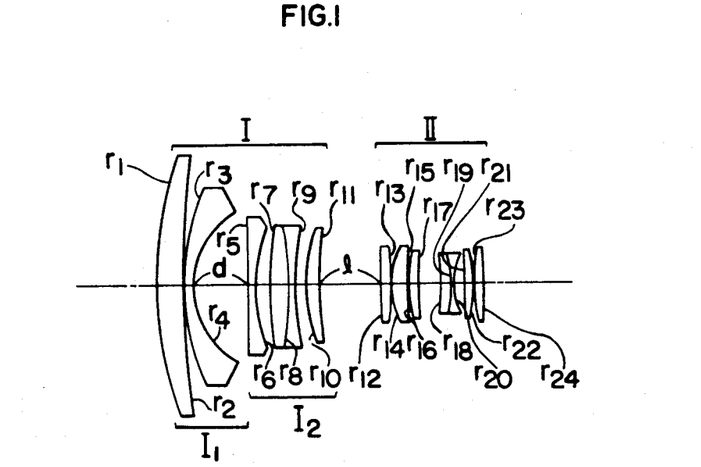
FIG. 1 represents a schematic view of a first embodiment of the present invention.
Figure 2:
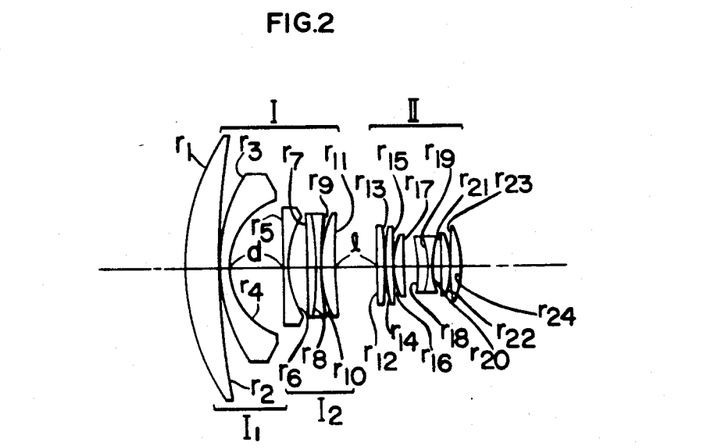
FIG. 2 represents a schematic view of a second embodiment of the present invention.

As apparent in FIGS. 1 and 2, a zoom lens system according to the present invention comprises a first lens group (I) of a negative refractive power including a first sub-group ($I_1$) located at the front of the zoom lens system and a second sub-group ($I_2$) located at the image side of the first sub-group ($I_1$) with a first variable air space (d) formed between the first and second sub-groups, and a second lens group (II) of a positive refractive power located at the image side of the first lens group (I) with a second variable air space (l) formed between the first and second lens groups, the first and second lens groups being shiftable along the optical axis with the second variable air space (l) varying in zooming operation, and the first lens group (I) being shiftable along the optical axis with the first variable air space (d) varying in focusing operation, wherein the zoom lens system fulfills the following conditions:

$$1.4 < |f_{I1}|/f_s < 3.0 \text{ and } f_{I1} < 0, \tag{1}$$

$$0.3 < d/f_S < 0.8, \tag{2}$$

wherein $f_{I1}$ represents the focal length of the first sub-group, d represents the axial width of the first variable air space with the zoom lens system focused to infinity, and $f_S$ represents the focal length of the whole zoom lens system in the shortest focal length condition.

Further, as apparent in FIGS. 1 and 2, the first sub-group ($I_1$) of the present invention includes a positive component, which is a front component of the zoom lens system, and a negative component located at the image side of the positive component and facing the first variable air space (d). The second sub-group ($I_2$) includes a negative component facing the first variable air space (d), whereby the first variable air space (d) is sandwitched in between a pair of negative components. In the present invention, the term, "component" includes the meaning of a single lens and of a cemented doublet.

The above condition (1) is to define the refractive power of the first sub-group ($I_1$), which corresponds to all the lens components at the object side of the first variable air space (d), relative to the focal length of the whole zoom lens system at the shortest focal length setting. This condition (1) requires that the paraxial light pencil should be suitably divergent in the first variable air space (d). If the lower limit is violated, it is difficult to correct astigmatism and coma because of the excessive negative refractive power of the first sub-group ($I_1$), from which an increased distortion will also result. On the other hand, it would be impossible to correct spherical aberration upon close focusing because of the insufficient negative refractive power of the first sub-group ($I_1$) if the upper limit is violated. The negative component facing the first variable air space (d) at the object side thereof is favorable to fulfill the condition (1).

If the lower limit of the condition (2), which is for defining the axial width of the first variable air space (d), is violated, the correction of astigmatism and coma would be deteriorated and the axial width of the first variable air space (d) would be insufficient for variation thereof to improve the deterioration upon the focusing to a close object. On the contrary, if the upper limit is violated, a desired compactness of the zoom lens system is not obtainable although the correction of astigmatism, coma and distortion may be possible.

Tables 1 and 2 correspond to the first and second embodiments of the present invention in the condition of infinity focusing, respectively. FIGS. 1 and 2, respectively represent the first and second embodiments in their shortest focal length conditions. As apparent from FIGS. 1 and 2, each of the embodiments has a first lens group (I) which includes, consecutively from the object side, a front positive component, a first negative component and a second negative component, in which the first variable air space (d) is located between the first and second negative components. In the Tables, the axial distance ($d_4$) with a star (*) corresponds to the first variable air space (d) of the present invention, which is narrowed in accordance with the shift of the first lens group for focusing, and the axial distance ($d_{11}$) with double stars (**) represents the second variable air space (l).

TABLE 1

[Embodiment 1]
$f = 24 \sim 35$ mm   F/3.5   $2\omega = 84° \sim 63°$

| | | Radius of Curvature | Axial Distance | Refractive Index | Abbe Number |
|---|---|---|---|---|---|
| I | $I_1$ | $r_1$ 74.01 | $d_1$ 6.00 | $N_1$ 1.6031 | $\nu_1$ 60.7 |
| | | $r_2$ 244.99 | $d_2$ 0.20 | | |
| | | $r_3$ 50.03 | $d_3$ 1.50 | $N_2$ 1.7725 | $\nu_2$ 49.8 |
| | | $r_4$ 18.04 | $d_4$* 12.00 | | |
| | $I_2$ | $r_5$ 691.03 | $d_5$ 1.50 | $N_3$ 1.7545 | $\nu_3$ 51.6 |
| | | $r_6$ 32.39 | $d_6$ 3.50 | | |
| | | $r_7$ 111.30 | $d_7$ 4.00 | $N_4$ 1.7106 | $\nu_4$ 43.3 |
| | | $r_8$ −93.67 | $d_8$ 1.00 | $N_5$ 1.6405 | $\nu_5$ 60.1 |
| | | $r_9$ 70.10 | $d_9$ 2.50 | | |
| | | $r_{10}$ 32.38 | $d_{10}$ 3.00 | $N_6$ 1.7174 | $\nu_6$ 29.4 |
| | | $r_{11}$ 64.64 | $d_{11}$** 13.33 − 1.50 | | |
| II | | $r_{12}$ 75.56 | $d_{12}$ 2.50 | $N_7$ 1.5173 | $\nu_7$ 69.4 |
| | | $r_{13}$ −96.23 | $d_{13}$ 0.10 | | |
| | | $r_{14}$ 21.90 | $d_{14}$ 3.36 | $N_8$ 1.5173 | $\nu_8$ 69.4 |
| | | $r_{15}$ 301.11 | $d_{15}$ 0.10 | | |
| | | $r_{16}$ 24.01 | $d_{16}$ 2.00 | $N_9$ 1.5173 | $\nu_9$ 69.4 |
| | | $r_{17}$ 51.82 | $d_{17}$ 5.29 | | |
| | | $r_{18}$ −52.25 | $d_{18}$ 2.00 | $N_{10}$ 1.8052 | $\nu_{10}$ 25.4 |
| | | $r_{19}$ −24.83 | $d_{19}$ 0.80 | $N_{11}$ 1.7569 | $\nu_{11}$ 29.7 |
| | | $r_{20}$ 18.78 | $d_{20}$ 2.03 | | |
| | | $r_{21}$ −69.23 | $d_{21}$ 2.00 | $N_{12}$ 1.5168 | $\nu_{12}$ 64.1 |
| | | $r_{22}$ −22.60 | $d_{22}$ 0.10 | | |
| | | $r_{23}$ 38.07 | $d_{23}$ 2.30 | $N_{13}$ 1.5168 | $\nu_{13}$ 64.1 |

TABLE 1-continued

[Embodiment 1]

f = 24~35 mm    F/3.5    2ω = 84°~63°

| Radius of Curvature | Axial Distance | Refractive Index | Abbe Number |
|---|---|---|---|
| $r_{24}$ −55.97 | | | |

TABLE 2

[Embodiment 2]

f = 20~28 mm    F/4.0    2ω = 94°~75°

| | | Radius of Curvature | Axial Distance | Refractive Index | Abbe Number |
|---|---|---|---|---|---|
| I | $I_1$ | $r_1$ 49.83 | | | |
| | | | $d_1$ 7.00 | $N_1$ 1.6031 | $v_1$ 60.7 |
| | | $r_2$ 146.93 | | | |
| | | | $d_2$ 0.20 | | |
| | | $r_3$ 36.34 | | | |
| | | | $d_3$ 1.50 | $N_2$ 1.7725 | $v_2$ 49.8 |
| | | $r_4$ 14.78 | | | |
| | | | $d_4$* 12.00 | | |
| | $I_2$ | $r_5$ 691.03 | | | |
| | | | $d_5$ 1.50 | $N_3$ 1.7545 | $v_3$ 51.6 |
| | | $r_6$ 22.50 | | | |
| | | | $d_6$ 3.50 | | |
| | | $r_7$ −1130.81 | | | |
| | | | $d_7$ 2.00 | $N_4$ 1.7106 | $v_4$ 43.3 |
| | | $r_8$ −100.57 | | | |
| | | | $d_8$ 1.00 | $N_5$ 1.6405 | $v_5$ 60.1 |
| | | $r_9$ 75.01 | | | |
| | | | $d_9$ 0.15 | | |
| | | $r_{10}$ 25.69 | | | |
| | | | $d_{10}$ 3.00 | $N_6$ 1.7174 | $v_6$ 29.4 |
| | | $r_{11}$ 98.99 | | | |
| | | | $d_{11}$** 9.24 −1.00 | | |
| II | | $r_{12}$ 221.86 | | | |
| | | | $d_{12}$ 1.50 | $N_7$ 1.5176 | $v_7$ 53.5 |
| | | $r_{13}$ −76.93 | | | |
| | | | $d_{13}$ 0.10 | | |
| | | $r_{14}$ 29.40 | | | |
| | | | $d_{14}$ 2.00 | $N_8$ 1.5176 | $v_8$ 53.5 |
| | | $r_{15}$ 854.04 | | | |
| | | | $d_{15}$ 0.10 | | |
| | | $r_{16}$ 17.24 | | | |
| | | | $d_{16}$ 2.00 | $N_9$ 1.5176 | $v_9$ 53.5 |
| | | $r_{17}$ 103.13 | | | |
| | | | $d_{17}$ 3.29 | | |
| | | $r_{18}$ −27.45 | | | |
| | | | $d_{18}$ 2.00 | $N_{10}$ 1.8052 | $v_{10}$ 25.4 |
| | | $r_{19}$ −25.61 | | | |
| | | | $d_{19}$ 0.80 | $N_{11}$ 1.7569 | $v_{11}$ 29.7 |
| | | $r_{20}$ 20.55 | | | |
| | | | $d_{20}$ 2.03 | | |
| | | $r_{21}$ −112.10 | | | |
| | | | $d_{21}$ 1.50 | $N_{12}$ 1.5168 | $v_{12}$ 64.1 |
| | | $r_{22}$ −21.36 | | | |
| | | | $d_{22}$ 0.10 | | |
| | | $r_{23}$ 73.05 | | | |
| | | | $d_{23}$ 2.55 | $N_{13}$ 1.5168 | $v_{13}$ 64.1 |
| | | $r_{24}$ −19.53 | | | |

Figure 3A:
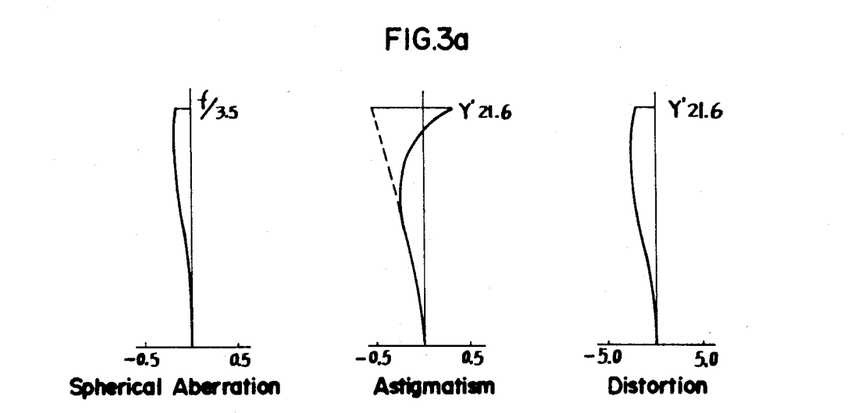
FIGS. 3a, 3b and 3c, and FIGS. 4a, 4b and 4c represent graphic plots of the various aberrations in various conditions of the first embodiment.
Figure 3B:
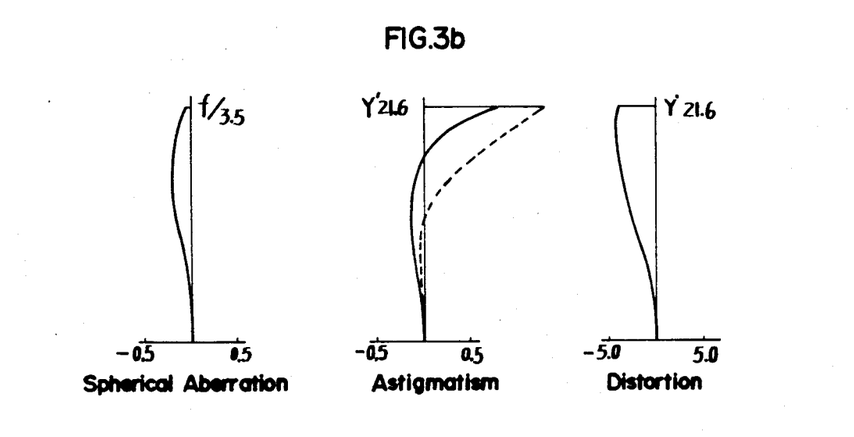
Figure 3C:
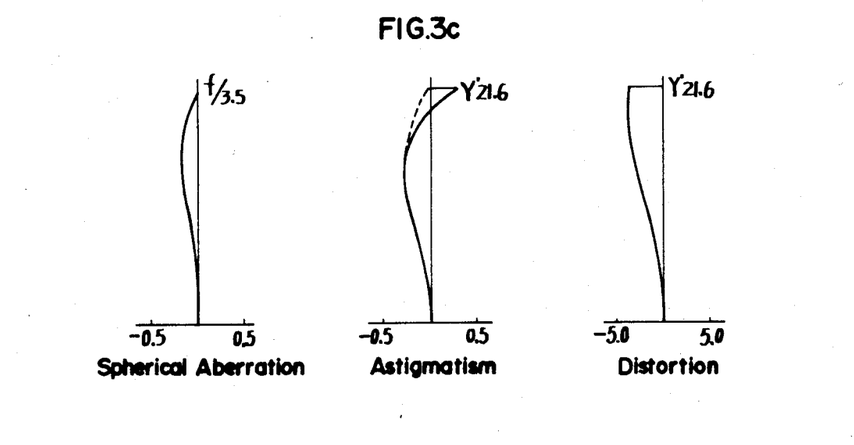

FIGS. 3a to 3c represent the aberration curves of the first embodiment in the shortest focal length (f=24 mm) condition. FIG. 3a corresponds to the focusing to infinity. FIG. 3b corresponds to the focusing to an object distance, 0.4 m (magnification −0.073) without varying the first variable air space (d). FIG. 3c corresponds to the focusing to the same object distance, 0.4 m while varying the first variable air space (d) by −1.75 according to the present invention. The comparison between FIGS. 3b and 3c shows the improvement in aberration correction in the close focusing condition with respect to astigmatism, spherical aberration and distortion according to the present invention.

Figure 4A:
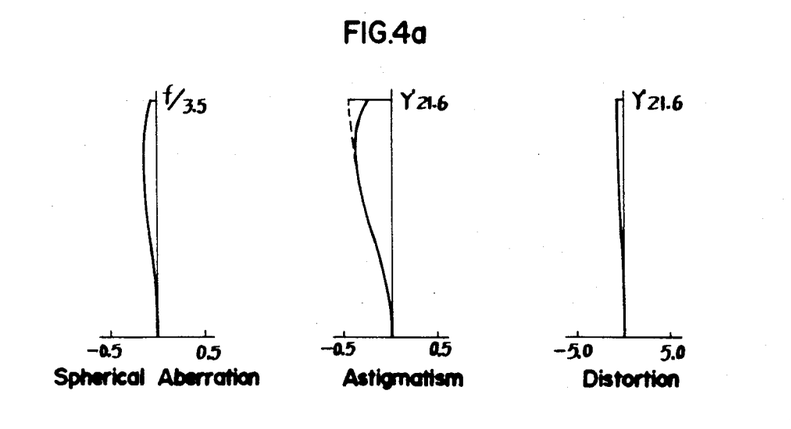
Figure 4B:
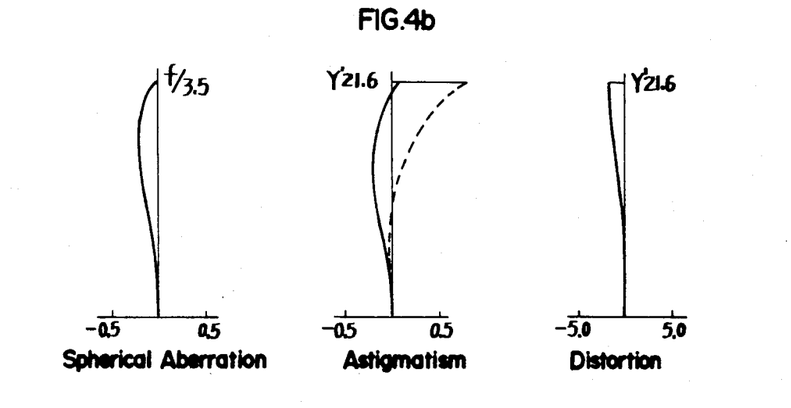
Figure 4C:
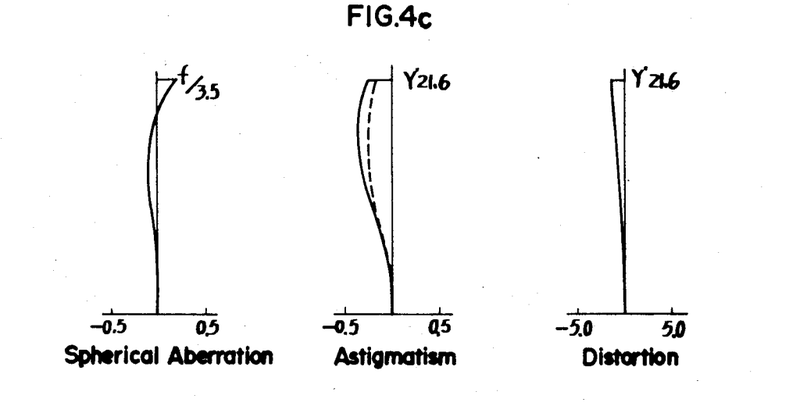

FIGS. 4a to 4c represent the aberration curves of the first embodiment in the longest focal length (f=35 mm) condition, and are understood in the same manner as in FIGS. 3a to 3c. In case of FIG. 4c, which is for a close focusing to 0.4 m with the first variable air space (d) varied by −1.75, the magnification is −0.106. It is apparent that the improvement is achieved also in the longest focal length condition.

Figure 5A:
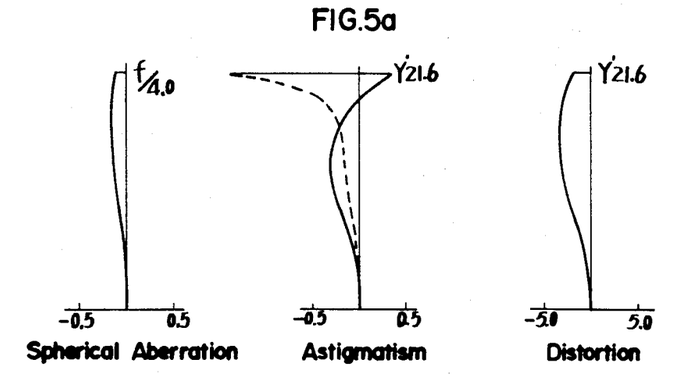
FIGS. 5a, 5b and 5c and FIGS. 6a, 6b and 6c represent graphic plots of the various aberrations in various conditions of the second embodiment.
Figure 5B:
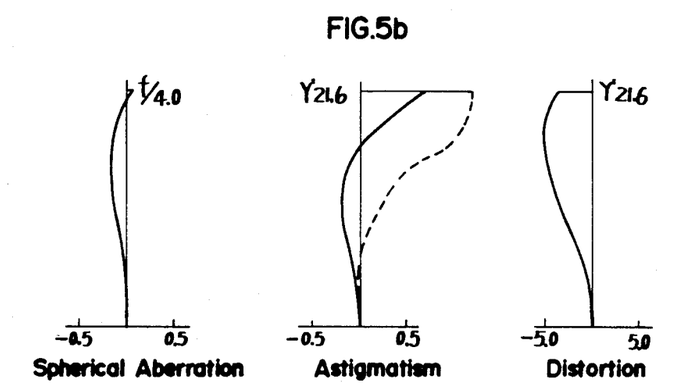
Figure 5C:
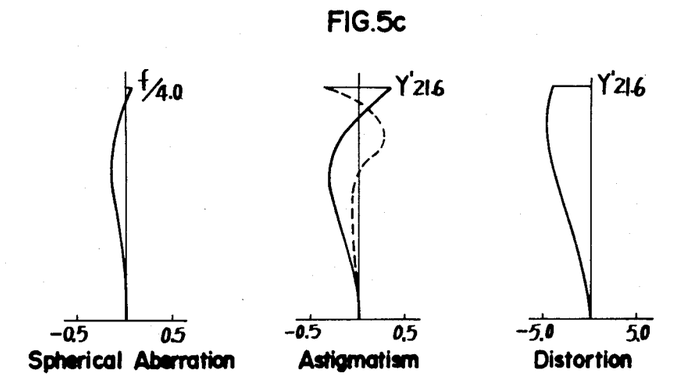
Figure 6A:
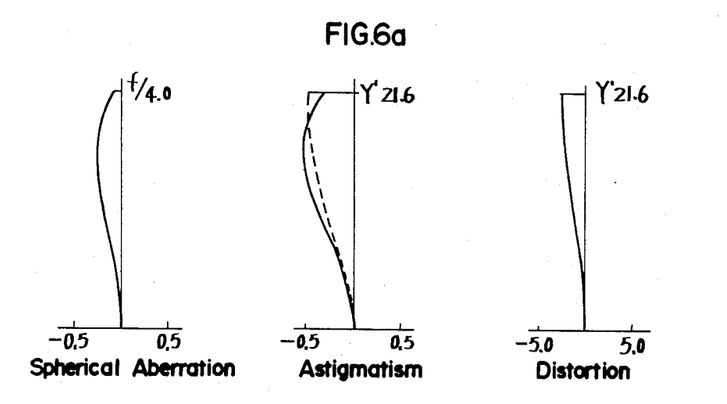
Figure 6B:
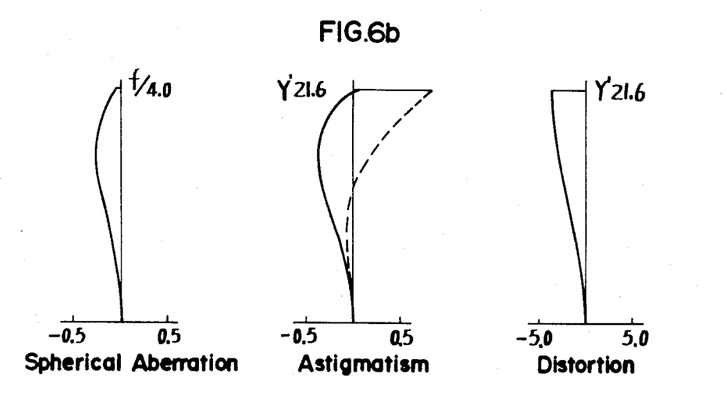
Figure 6C:
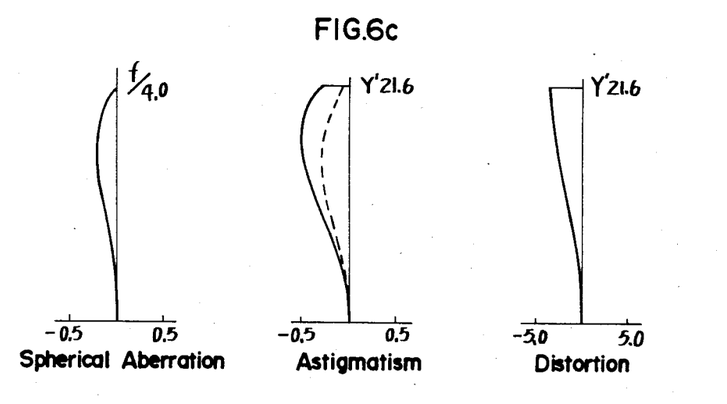

FIGS. 5a to 5c correspond to the aberration curves of the second embodiment in the shortest focal length (f=20 mm) condition, while FIGS. 6a to 6c correspond to those in the longest focal length (f=28 mm) condition. FIGS. 5a to 6a represent the case of infinity focusing as in the first embodiment. In each of the cases of FIGS. 5b, 5c, 6b and 6c, the object distance is 0.4 m. And, the magnification is −0.06 for the cases of FIGS. 5b and 5c, and −0.082 for the cases of FIGS. 6b and 6c. In this second embodiment, the first variable air space (d) is varied by −0.98 in the cases of FIGS. 5c and 6c. It is needless to say that FIGS. 5b and 6b both correspond to the case of close focusing with the first variable air space (d) fixed at the value of infinity focusing, for enabling a comparison as those between FIGS. 3b and 3c, or between FIGS. 4b and 4c in the first embodiment.

While the above embodiments have been disclosed as the best modes presently contemplated by the inventor, it should be realized that these examples should not be interpreted as limiting, because artisans skilled in this field, once given the present teachings, can vary from these specific embodiments.

Accordingly, the scope of the present invention should be determined solely from the following claims in which we claim:

1. A zoom lens system comprising:
   a first lens group of a negative refractive power including a first sub-group located at the front of the zoom lens system and a second sub-group located at the image side of the first sub-group with a first variable air space formed between the first and second sub-groups; and
   a second lens group of a positive refractive power located at the image side of the first lens group with a second variable air space formed between the first and second lens groups, the first and second lens groups being shiftable along the optical axis with the second variable air space varying in zooming operation, and the first lens group being shiftable along the optical axis with the first variable air space varying in focusing operation, wherein the first sub-group includes a negative component at the image side end thereof so that the first variable air space is directly next to the negative component.

2. The invention of claim 1, wherein the second sub-group includes a negative component at the object side end thereof so that the first variable air space is directly next to the negative component of the second sub-group.

3. The invention of claim 1, wherein the negative component has a concave surface facing the first variable air space.

4. A zoom lens system comprising:
   a first lens group of a negative refractive power including a first sub-group located at the front of the zoom lens system and a second sub-group located at the image side of the first sub-group with a first variable air space formed between the first and second sub-groups; and a second lens group of a positive refractive power located at the image side of the first lens group with a second variable air space formed between the first and second lens groups, the first and second lens groups being shiftable along the optical axis with the second variable air space varying during a zooming operation, and the first lens group being shiftable along the optical axis with the first variable air space varying during a focusing operation, wherein the first sub-group includes a negative component and the second sub-group includes a negative component, and wherein the first sub-group further includes a positive component located at the front of the zoom lens system.

5. A zoom lens system comprising:

a first lens group of a negative refractive power including a first sub-group located at the front of the zoom lens system and a second sub-group located at the image side of the first sub-group with a first variable air space formed between the first and second sub-groups, the first sub-group includes a positive component and a negative component located at the image side of the positive component; and a second lens group of a positive refractive power located at the image side of the first lens group with a second variable air space formed between the first and second lens groups, the first and second lens groups being shiftable along the optical axis with the second variable air space varying in a zooming operation, and the first lens group being shiftable along the optical axis with the first variable air space varying in a focusing operation, wherein the lens system fulfills the following conditions:

$1.4 < |f_{I1}|/f_S < 3.0, f_{I1} < 0$ $0.3 < d/f_S < 0.8$ wherein:

$f_{I1}$ represents the focal length of the first sub-group;

d represents the axial width of the first variable air space with the zoom lens system focused to infinity; and $f_S$ represents the focal length of the whole zoom lens system in the shorts focal length condition.

6. A zoom lens system comprising:

a first lens group of a negative refractive power including a first sub-group located at the front of the zoom lens system and a second sub-group located at the image side of the first sub-group, wherein the first sub-group includes a negative component at the image side end thereof, and the second sub-group includes a negative component at the object side end thereof and a first variable air space is formed between the two negative components, and a second lens group of a positive refractive power located at the image side of the first lens group with a second variable air space formed between the first and second lens groups, the first and second lens groups being shiftable along the optical axis with the second variable air space varying in a zooming operation, and the first lens group being shiftable along the optical axis with the first variable air space varying in a focusing operation, wherein the lens system fulfills the following conditions:

$1.4 < |f_{I1}|/f_S < 3.0, f_{I1} < 0$ $0.3 < d/f_S < 0.8$ wherein:

$f_{I1}$ represents the focal length of the first sub-group;

d represents the axial width of the first variable air space with the zoom lens system focused to infinity; and $f_S$ represents the focal length of the whole zoom lens system in the shortest focal length condition.

7. A zoom lens system comprising:

a first lens group of a negative refractive power including a first sub-group located at the front of the zoom lens system and a second sub-group located at the image side of the first sub-group with the first variable air space formed between the first and second sub-groups, the first sub-group includes, consecutively from the object side, a front positive component and a first negative component and the second sub-group has a second negative component located at the image side of the first sub-group, wherein the first variable air space is located between the first and second negative components; and a second lens group of a positive refractive power located at the image side of the first lens group with a second variable air space formed between the first and second lens groups, the first and second lens groups being shiftable along the optical axis with the second variable air space varying in a zooming operation, and the first lens group being shiftable along the optical axis with the first variable air space varying in a focusing operation, wherein the lens system fulfills the following conditions:

$1.4 < |f_{I1}|/f_S < 3.0, f_{I1} < 0$ $0.3 < d/f_S < 0.8$ wherein;

$f_{I1}$ represents the focal length of the first sub-group;

d represents the axial width of the first variable air space with the zoom lens system focused to infinity; and $f_S$ represents the focal length of the whole zoom lens system in the shortest focal length condition.

8. A zoom lens system comprising:

a first lens group of a negative refractive power including a first sub-group located at the front of the zoom lens system and a second sub-group located at the image side of the first sub-group with a first variable air space formed between the first and second sub-groups, the first sub-group includes a negative component at the image side and thereof so that the first variable air space is directly next to the negative component, and a second lens group of a positive refractive power located at the image side of the first lens group with a second variable air space formed between the first and second lens groups, the first and second lens groups being shiftable along the optical axis with the second variable air space varying in a zooming operation, and the first lens group being shiftable along the optical axis with the first variable air space varying in a focusing operation, wherein the lens system fulfills the following conditions:

$$1.4 < |f_{I1}|/f_S < 3.0, \quad F_{I1} < 0$$

$$0.3 < d/f_S < 0.8$$

wherein:
$f_{I1}$ represents the focal length of the first sub-group;
d represents the axial width of the first variable air space with the zoom lens system focused to infinity; and
$f_S$ represents the focal length of the whole zoom lens system in the shortest focal length condition.

9. The invention of claim 8, wherein the condition for d/fs is as follows:

$$0.35 < d/fs < 0.8.$$

10. A zoom lens system comprising:
a first lens group of a negative refractive power including a first sub-group located at the front of the zoom lens system and a second sub-group located at the image side of the first sub-group with a first variable air space formed between the first and second sub-groups; and
a second lens group of a positive refractive power located at the image side of the first lens group with a second variable air space formed between the first and second lens grops, the first and second lens groups being shiftable along the optical axis with the second variable air space varying in a zooming operation, and the first lens group being shiftable along the optical axis with the first variable air space varying in a focusing operation, wherein the first sub-group includes a negative component at the image side end thereof so that the first variable air space is directly next to the negative component, wherein the lens system comprises the following design parameters:

| | | f = 24~35 mm | F/3.5 | 2ω = 84°~63° | |
|---|---|---|---|---|---|
| | | Radius of Curvature | Axial Distance | Refractive Index | Abbe Number |
| I | I₁ | $r_1$ 74.01 | | | |
| | | | $d_1$ 6.00 | $N_1$ 1.6031 | $v_1$ 60.7 |
| | | $r_2$ 244.99 | | | |
| | | | $d_2$ 0.20 | | |
| | | $r_3$ 50.03 | | | |
| | | | $d_3$ 1.50 | $N_2$ 1.7725 | $v_2$ 49.8 |
| | | $r_4$ 18.04 | | | |
| | | | $d_4^*$ 12.00 | | |
| | I₂ | $r_5$ 691.03 | | | |
| | | | $d_5$ 1.50 | $N_3$ 1.7545 | $v_3$ 51.6 |
| | | $r_6$ 32.39 | | | |
| | | | $d_6$ 3.50 | | |
| | | $r_7$ 111.30 | | | |
| | | | $d_7$ 4.00 | $N_4$ 1.7106 | $v_4$ 43.3 |
| | | $r_8$ −93.67 | | | |
| | | | $d_8$ 1.00 | $N_5$ 1.6405 | $v_5$ 60.1 |
| | | $r_9$ 70.10 | | | |
| | | | $d_9$ 2.50 | | |
| | | $r_{10}$ 32.38 | | | |
| | | | $d_{10}$ 3.00 | $N_6$ 1.7174 | $v_6$ 29.4 |
| | | $r_{11}$ 64.64 | | | |
| | | | $d_{11}^{**}$ 13.33 | −1.50 | |
| | | $r_{12}$ 75.56 | | | |
| | | | $d_{12}$ 2.50 | $N_7$ 1.5173 | $v_7$ 69.4 |
| | | $r_{13}$ −96.23 | | | |
| | | | $d_{13}$ 0.10 | | |
| | | $r_{14}$ 21.90 | | | |

-continued

| | f = 24~35 mm | F/3.5 | 2ω = 84°~63° |
|---|---|---|---|
| Radius of Curvature | Axial Distance | Refractive Index | Abbe Number |
| | $d_{14}$ 3.36 | $N_8$ 1.5173 | $v_8$ 69.4 |
| $r_{15}$ 301.11 | | | |
| | $d_{15}$ 0.10 | | |
| $r_{16}$ 24.01 | | | |
| | $d_{16}$ 2.00 | $N_9$ 1.5173 | $v_9$ 69.4 |
| $r_{17}$ 51.82 | | | |
| | $d_{17}$ 5.29 | | |
| $r_{18}$ −52.25 | | | |
| | $d_{18}$ 2.00 | $N_{10}$ 1.8052 | $v_{10}$ 25.4 |
| $r_{19}$ −24.83 | | | |
| | $d_{19}$ 0.80 | $N_{11}$ 1.7569 | $v_{11}$ 29.7 |
| $r_{20}$ 18.78 | | | |
| | $d_{20}$ 2.03 | | |
| $r_{21}$ −69.23 | | | |
| | $d_{21}$ 2.00 | $N_{12}$ 1.5168 | $v_{12}$ 64.1 |
| $r_{22}$ −22.60 | | | |
| | $d_{22}$ 0.10 | | |
| $r_{23}$ 38.07 | | | |
| | $d_{23}$ 2.30 | $N_{13}$ 1.5168 | $v_{13}$ 64.1 |
| $r_{24}$ −55.97 | | | |

(II group bracket on left side of table)

11. A zoom lens system comprising:
a first lens group of a negative refractive power including a first sub-group located at the front of the zoom lens system and a second sub-group located at the image side of the first sub-group with a first variable air space formed between the first and second sub-groups, and
a second lens group of a positive refractive power located at the image side of the first lens group with a second variable air space formed between the first and second lens groups, the first and second lens groups being shiftable along the optical axis with the second variable air space varying in a zooming operation, and the first lens group being shiftable along the optical axis with the first variable air space varying in a focusing operation, wherein the first sub-group includes a negative component at the image side end thereof so that the first variable air space is directly next to the negative component, wherein the lens system comprises the following design parameters:

| | | f = 20~28 mm | F/4.0 | 2ω = 94°~75° | |
|---|---|---|---|---|---|
| | | Radius of Curvature | Axial Distance | Refractive Index | Abbe Number |
| I | I₁ | $r_1$ 49.83 | | | |
| | | | $d_1$ 7.00 | $N_1$ 1.6031 | $v_1$ 60.7 |
| | | $r_2$ 146.93 | | | |
| | | | $d_2$ 0.20 | | |
| | | $r_3$ 36.34 | | | |
| | | | $d_3$ 1.50 | $N_2$ 1.7725 | $v_2$ 49.8 |
| | | $r_4$ 14.78 | | | |
| | | | $d_4^*$ 12.00 | | |
| | I₂ | $r_5$ 691.03 | | | |
| | | | $d_5$ 1.50 | $N_3$ 1.7545 | $v_3$ 51.6 |
| | | $r_6$ 22.50 | | | |
| | | | $d_6$ 3.50 | | |
| | | $r_7$ −1130.81 | | | |
| | | | $d_7$ 2.00 | $N_4$ 1.7106 | $v_4$ 43.3 |
| | | $r_8$ −100.57 | | | |
| | | | $d_8$ 1.00 | $N_5$ 1.6405 | $v_5$ 60.1 |
| | | $r_9$ 75.01 | | | |
| | | | $d_9$ 0.15 | | |
| | | $r_{10}$ 25.69 | | | |
| | | | $d_{10}$ 3.00 | $N_6$ 1.7174 | $v_6$ 29.4 |
| | | $r_{11}$ 98.99 | | | |
| | | | $d_{11}^{**}$ 9.24 | −1.00 | |
| | | $r_{12}$ 221.86 | | | |
| | | | $d_{12}$ 1.50 | $N_7$ 1.5176 | $v_7$ 53.5 |

-continued $f = 20\sim28$ mm  F/4.0  $2\omega = 94°\sim75°$

| | Radius of Curvature | Axial Distance | Refractive Index | Abbe Number |
|---|---|---|---|---|
| | $r_{13}$ −76.93 | | | |
| | | $d_{13}$ 0.10 | | |
| | $r_{14}$ 29.40 | | | |
| | | $d_{14}$ 2.00 | $N_8$ 1.5176 | $\nu_8$ 53.5 |
| | $r_{15}$ 854.04 | | | |
| | | $d_{15}$ 0.10 | | |
| | $r_{16}$ 17.24 | | | |
| | | $d_{16}$ 2.00 | $N_9$ 1.5176 | $\nu_9$ 53.5 |
| | $r_{17}$ 103.13 | | | |
| | | $d_{17}$ 3.29 | | |
| II | $r_{18}$ −27.45 | | | |
| | | $d_{18}$ 2.00 | $N_{10}$ 1.8052 | $\nu_{10}$ 25.4 |
| | $r_{19}$ −25.61 | | | |
| | | $d_{19}$ 0.80 | $N_{11}$ 1.7569 | $\nu_{11}$ 29.7 |
| | $r_{20}$ 20.55 | | | |
| | | $d_{20}$ 2.03 | | |
| | $r_{21}$ −112.10 | | | |
| | | $d_{21}$ 1.50 | $N_{12}$ 1.5168 | $\nu_{12}$ 64.1 |
| | $r_{22}$ −21.36 | | | |
| | | $d_{22}$ 0.10 | | |
| | $r_{23}$ 73.05 | | | |
| | | $d_{23}$ 2.55 | $N_{13}$ 1.5168 | $\nu_{13}$ 64.1 |
| | $r_{24}$ −19.53 | | | |

12. A zoom lens system comprising:
a first lens group of a negative refractive power including a first sub-group located at the front of the zoom lens system and a second sub-group located at the image side of the first sub-group with a first variable air space formed between the first and second sub-groups; and
a second lens group of a positive refractive power located at the image side of the first lens group with a second variable air space formed between the first and second lens groups, the second variable air space being varied with the first variable air space being maintained in a zooming operation and both the first and second variable air spaces being varied in a focusing operation, wherein the first sub-group includes a positive component and a negative component located at the image side of the positive component.

13. The invention of claim 12 wherein the lens system fulfills the following conditions:

$$1.4 < |f_{I1}|/f_S < 3.0, \quad f_{I1} < 0$$

$$0.3 < d/f_S < 0.8$$

wherein:
$f_{I1}$ represents the focal length of the first subgroup;
d represents the axial width of the first variable air space with the zoom lens system focused to infinity; and
$f_S$ represents the focal length of the whole zoom lens system in the shortest focal length condition.

14. A zoom lens system comprising:
a first lens group of a negative refractive power including a first sub-group located at the front of the zoom lens system and a second sub-group located at the image side of the first sub-group with a first variable air space formed between the first and second sub-groups; and
a second lens group of a positive refractive power located at the image side of the first lens group with a second variable air space formed between the first and second lens groups, the second variable air space being varied with the first variable air space being maintained during a zooming operation and both the first and second variable air spaces being varied during a focusing operation, wherein the first sub-group includes a negative component at the image side end thereof so that the first variable air space is directly next to the negative component.

15. The invention of claim 14, wherein the second sub-group includes a negative component at the object side end thereof so that the negative component of the second sub-group is directly next to the first variable air space.

16. The invention of claim 14 wherein the lens system fulfills the following conditions:

$$1.4 < |f_{I1}|/f_S < 3.0, \quad f_{I1} < 0$$

$$0.3 < d/f_S < 0.8$$

wherein:
$f_{I1}$ represents the focal length of the first subgroup;
d represents the axial width of the first variable air space with the zoom lens system focused to infinity; and
$f_S$ represents the focal length of the whole zoom lens system in the shortest focal length condition.

17. A zoom lens system comprising:
a first lens group of a negative refractive power including a first sub-group located at the front of the zoom lens system and a second sub-group located at the image side of the first sub-group with a first variable air space formed between the first and second sub-groups; and
a second lens group of a positive refractive power located at the image side of the first lens group with a second variable air space formed between the first and second lens groups, the second variable air space being varied with the first variable air space being maintained in a zooming operation and both the first and second variable air spaces being varied in a focusing operation, wherein the first sub-group includes a negative component and the second sub-group includes a negative component, and wherein the first sub-group further includes a positive component located at the front of the zoom lens system.

18. The invention of claim 17 wherein the lens system fulfills the following conditions:

$$1.4 < |f_{I1}|/f_S < 3.0, \quad f_{I1} < 0$$

$$0.3 < d/f_S < 0.8$$

wherein:
$f_{I1}$ represents the focal length of the first subgroup;
d represents the axial width of the first variable air space with the zoom lens system focused to infinity; and
$f_S$ represents the focal length of the whole zoom lens system in the shortest focal length condition.

* * * * *